(12) United States Patent
Kim

(10) Patent No.: US 9,081,200 B2
(45) Date of Patent: Jul. 14, 2015

(54) APPARATUS AND METHOD FOR MEASURING PICTURE QUALITY OF STEREOSCOPIC DISPLAY DEVICE, AND PICTURE QUALITY ANALYZING METHOD USING THE SAME

(75) Inventor: JaeHong Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 738 days.

(21) Appl. No.: 13/299,733

(22) Filed: Nov. 18, 2011

(65) Prior Publication Data

US 2012/0127283 A1 May 24, 2012

(30) Foreign Application Priority Data

Nov. 19, 2010 (KR) .................. 10-2010-0115433

(51) Int. Cl.
*H04N 13/04* (2006.01)
*G02B 27/26* (2006.01)

(52) U.S. Cl.
CPC ............ *G02B 27/26* (2013.01); *H04N 13/0425* (2013.01); *H04N 13/0438* (2013.01)

(58) Field of Classification Search
CPC . G02B 27/26; H04N 13/0425; H04N 13/0438
See application file for complete search history.

(56) References Cited

U.S. PATENT DOCUMENTS

| | | | |
|---|---|---|---|
| 6,011,580 A * | 1/2000 | Hattori et al. | 348/57 |
| 6,151,062 A * | 11/2000 | Inoguchi et al. | 348/51 |
| 7,483,550 B2 * | 1/2009 | Oka et al. | 382/107 |
| 7,557,832 B2 * | 7/2009 | Lindenstruth et al. | 348/208.99 |
| 2006/0221443 A1 | 10/2006 | Cha et al. | |
| 2009/0040401 A1 * | 2/2009 | Tamura et al. | 349/15 |
| 2009/0322857 A1 * | 12/2009 | Jacobs et al. | 348/42 |
| 2010/0045780 A1 * | 2/2010 | Kwon et al. | 348/51 |

FOREIGN PATENT DOCUMENTS

| | | |
|---|---|---|
| CN | 1847926 | 10/2006 |
| JP | 2006-337844 | 12/2006 |

OTHER PUBLICATIONS

Haung et al., Measurement of Contrast Ratios for 3D Display, Proceedings of SPIE, vol. 4080, pp. 78-86, 2000.

* cited by examiner

*Primary Examiner* — Dave Czekaj
*Assistant Examiner* — Md Haque
(74) *Attorney, Agent, or Firm* — Morgan, Lewis & Bockius LLP

(57) ABSTRACT

Disclosed are an apparatus and method for measuring picture quality of a stereoscopic display device, and a picture quality analyzing method using the same, which quantify a motion artifact of a 3D moving picture in consideration of even an undesired moving picture artifact caused by a motion and gray-to-gray crosstalk, and moreover measure a motion blur. The picture quality measuring apparatus includes a pattern generator, a 3D display device, a polarization member, a following camera, and an analyzer. The pattern generator generates a right-eye and a left-eye moving picture pattern which move at a predetermined scroll speed. The 3D display device displays the right-eye and left-eye moving picture pattern inputted from the pattern generator. The following camera follows respective boundary portions of the right-eye and left-eye moving picture pattern, which pass through the polarization member and are incident on the following camera, to measure luminance.

20 Claims, 5 Drawing Sheets

APPARATUS AND METHOD FOR MEASURING PICTURE QUALITY OF STEREOSCOPIC DISPLAY DEVICE, AND PICTURE QUALITY ANALYZING METHOD USING THE SAME

CROSS REFERENCE TO RELATED APPLICATIONS

This application claims the benefit of the Korean Patent Application No. 10-2010-0115433 filed on Nov. 19, 2010, which is hereby incorporated by reference as if fully set forth herein.

BACKGROUND

1. Field of the Invention

The present invention relates to a stereoscopic display device, and more particularly, an apparatus and method for measuring picture quality of a stereoscopic display device, and a picture quality analyzing method using the same, which quantify a motion artifact of a Three-Dimensional (3D) moving picture in consideration of even an undesired moving picture artifact caused by a motion and gray-to-gray crosstalk, and moreover measure a motion blur.

2. Discussion of the Related Art

Recently, as 3D broadcast is practically provided, stereoscopic display devices are attracting much attention as next-generation display devices. Therefore, it is increasingly required to evaluate the optical characteristics of stereoscopic display devices and notify consumers of the excellences of products.

However, since stereoscopic display devices are in an initial market access stage and there is no evaluation system that is objective and standardized for the stereoscopic display devices, the objective optical characteristics of the stereoscopic display devices cannot be provided to consumers. Due to this reason, the vitalization of 3D broadcast and the provision of stereoscopic display devices are being delayed although the stereoscopic display devices are attracting much attention as next-generation display devices.

Therefore, a picture quality measuring apparatus (system) and method are required for quantifying a motion artifact of a 3D moving picture in consideration of a shadow (i.e., a moving picture artifact) caused by the optical characteristic (i.e., crosstalk) of a moving picture for a stereoscopic display device, and measuring a motion blur.

SUMMARY

Accordingly, the present invention is directed to an apparatus and method for measuring picture quality of a stereoscopic display device, and a picture quality analyzing method using the same, which quantify a motion artifact of a 3D moving picture in consideration of even an undesired moving picture artifact caused by a motion and gray-to-gray crosstalk, and moreover measure a motion blur.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an apparatus for measuring picture quality of a stereoscopic display device which includes: a pattern generator generating a right-eye moving picture pattern and a left-eye moving picture pattern which move at a predetermined scroll speed; a Three-Dimensional (3D) display device displaying the right-eye moving picture pattern and left-eye moving picture pattern inputted from the pattern generator, on a screen; a polarization member selectively passing the right-eye moving picture pattern and left-eye moving picture pattern displayed on the 3D display device; a following camera following respective boundary portions of the right-eye moving picture pattern and left-eye moving picture pattern, which pass through the polarization member and are incident on the following camera, to measure luminance; and an analyzer analyzing the luminance measured by the following camera to generate a Moving Picture Response Curve (MPRC).

The MPRC may be schematized by a change of luminance which occurs with time in the boundary portion.

In another aspect of the present invention, there is provided a method of measuring picture quality of a stereoscopic display device which includes: generating a right-eye moving picture pattern and a left-eye moving picture pattern which move at a predetermined scroll speed; displaying the right-eye moving picture pattern and left-eye moving picture pattern on a screen of a 3D display device; selectively passing, by a polarization member, the right-eye moving picture pattern and left-eye moving picture pattern displayed on the 3D display device; following, by a following camera, respective boundary portions of the right-eye moving picture pattern and left-eye moving picture pattern, which pass through the polarization member, to measure luminance; and analyzing the luminance measured by the following camera to generate an MPRC.

In another aspect of the present invention, there is provided a method of analyzing picture quality of a stereoscopic display device which includes: calculating an artifact width on the basis of the MPRC generated by the picture quality measuring method; and calculating a 3D motion artifact width by dividing the artifact width by the scroll speed.

The artifact width may be a sum of the number of pixels in a first shadow area due to a depth from the screen of the 3D display device to a stereoscopic phase and the number of pixels in a second shadow area due to a display type of a moving picture pattern displayed on the screen of the 3D display device, between an initial luminance value and final luminance value of the MPRC for the boundary portion.

The picture quality analyzing method may further include calculating a blurred edge width according to the number of pixels in a blurred area corresponding to the initial luminance value and second shadow area.

The artifact width may be the number of pixels in a shadow area due to a depth from the screen of the 3D display device to a stereoscopic phase, between an initial luminance value and final luminance value of the MPRC for the boundary portion.

The picture quality analyzing method may further include calculating a blurred edge width according to the number of pixels in a blurred area corresponding to the initial luminance value and shadow area.

The picture quality analyzing method may further include calculating a 3D motion artifact time by dividing the artifact width by a multiplication of the scroll speed and a frame rate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an imprinting apparatus according to the present invention will be described with reference to the accompanying drawings.

Figure 1:
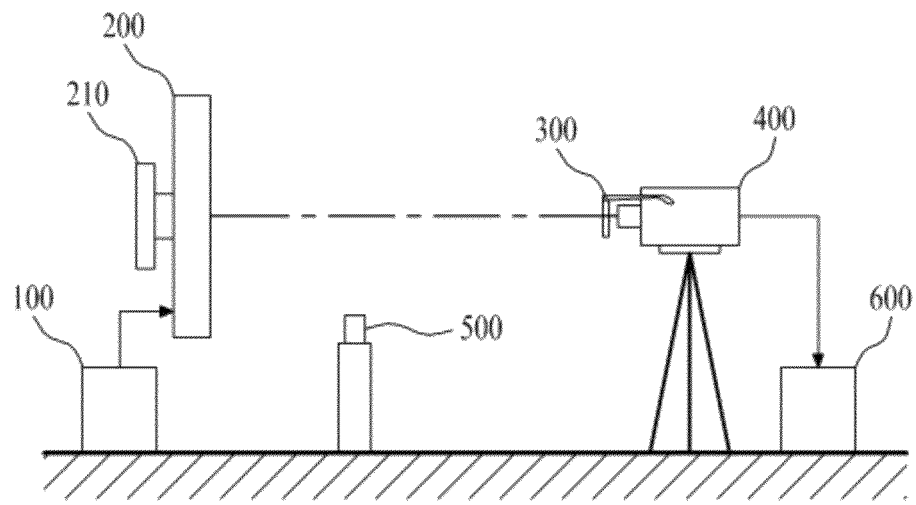
FIG. 1 is a diagram schematically illustrating an apparatus for measuring picture quality of a stereoscopic display device, according to an embodiment of the present invention.
Figure 2:
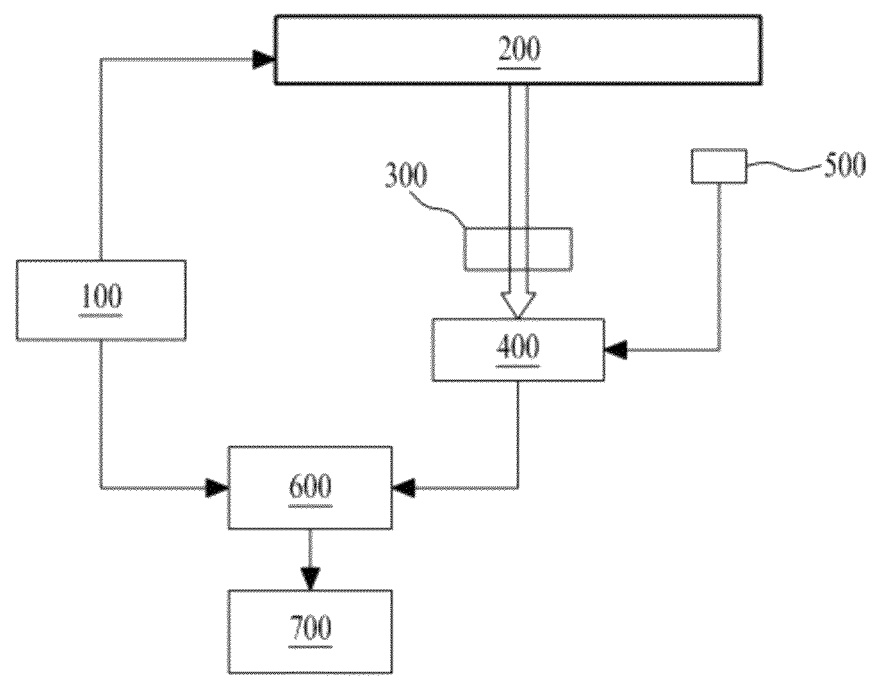
FIG. 2 is a diagram schematically illustrating an apparatus for measuring picture quality of a stereoscopic display device, according to an embodiment of the present invention.

FIG. 1 is a diagram schematically illustrating an apparatus for measuring picture quality of a stereoscopic display device, according to an embodiment of the present invention. FIG. 2 is a diagram schematically illustrating an apparatus for measuring picture quality of a stereoscopic display device, according to an embodiment of the present invention.

Referring to FIGS. 1 and 2, an apparatus for measuring picture quality of a stereoscopic display device according to an embodiment of the present invention includes a pattern generator 100, a 3D display device 200, a polarization member 300, a following camera 400, a photo sensor 500, and an analyzer 600.

The pattern generator 100 generates a 3D pattern signal for measuring the picture quality of the 3D display device 200, and supplies the generated 3D pattern signal to the 3D display device 200. Herein, the 3D pattern signal is divided in time, and thus includes a right-eye moving picture pattern and a left-eye moving picture pattern that are displayed on the 3D display device 200.

Figure 3A:
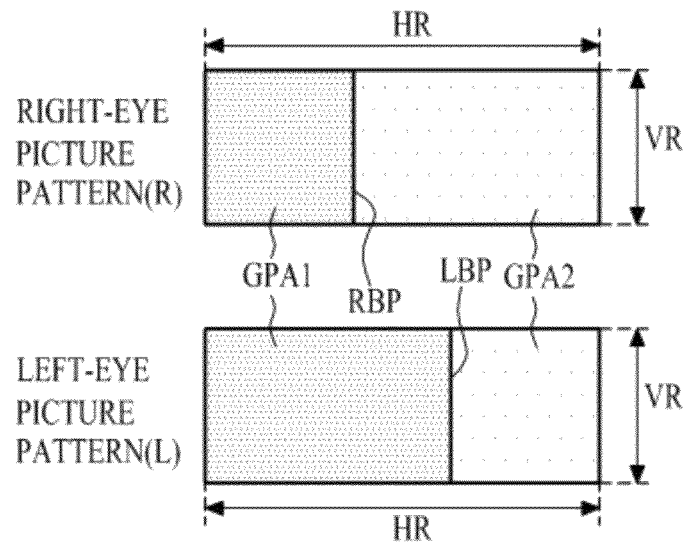
FIGS. 3A and 3B are a diagram illustrating a right-eye moving picture pattern and a left-eye moving picture pattern which are generated by a pattern generator of FIG. 2.

As illustrated in FIG. 3A, the right-eye moving picture pattern (R) and left-eye moving picture pattern (L) may have the same horizontal resolution HR as that of the 3D display device 200, but have a vertical resolution VR that is half of the vertical resolution of the 3D display device 200. For example, when the horizontal resolution and vertical resolution of the 3D display device 200 are 1920×1080, the horizontal resolution HR and vertical resolution VR of the right-eye moving picture pattern (R) are 1920×960. Likewise, the horizontal resolution HR and vertical resolution VR of the left-eye moving picture pattern (L) are 1920×960.

Figure 3B:
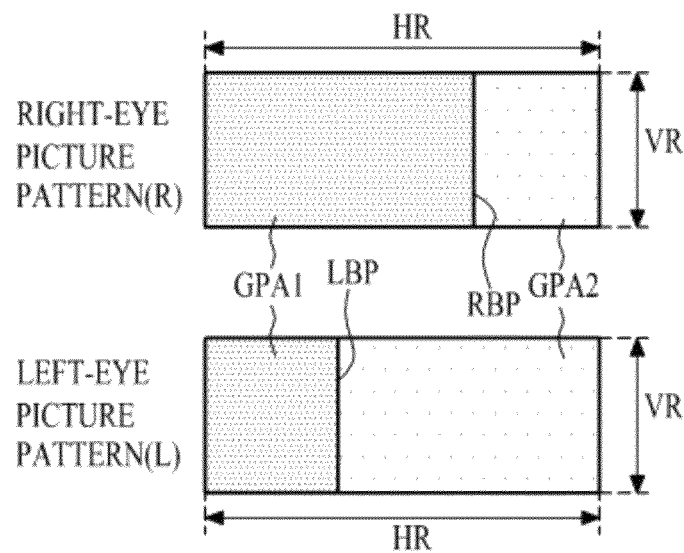

Moreover, as illustrated in FIG. 3A, the right-eye moving picture pattern (R) and left-eye moving picture pattern (L) may have a negative parallax by which a 3D picture is shown to protrude from a screen of the 3D display device 200, or as illustrated in FIG. 3B, the right-eye moving picture pattern (R) and left-eye moving picture pattern (L) may have a positive parallax by which the 3D picture is shown to dent from the screen of the 3D display device 200. For this end, each of the right-eye moving picture pattern (R) and left-eye moving picture pattern (L) includes first and second grayscale pattern areas GPA1 and GPA2. For example, when the 3D picture displayed on the 3D display device 200 has a grayscale level from 0 to 255 based on 8 bits, each of the first and second grayscale pattern areas GPA1 and GPA2 may have the same grayscale level or different grayscale levels within a grayscale range of 0 to 255, and the first and second grayscale pattern areas GPA1 and GPA2 may be combined into an n×n grayscale pattern (where n is a natural number from 1 to 255) by inter-grayscale matching.

When the first grayscale pattern area GPA1 of the right-eye moving picture pattern (R) is greater than the first grayscale pattern area GPA1 of the left-eye moving picture pattern (L), the right-eye moving picture pattern (R) and left-eye moving picture pattern (L) have a positive parallax. On the other hand, when the first grayscale pattern area GPA1 of the right-eye moving picture pattern (R) is not greater than the first grayscale pattern area GPA1 of the left-eye moving picture pattern (L), the right-eye moving picture pattern (R) and left-eye moving picture pattern (L) have a negative parallax.

The pattern generator 100 generates the right-eye moving picture pattern (R) and the left-eye moving picture pattern (L) that move at a predetermined scroll speed, and supplies the right-eye moving picture pattern (R) and left-eye moving picture pattern (L) to the 3D display device 200. Herein, the scroll speed may be about 8 ppf (which is pixel per frame), but is not limited thereto. As another example, the scroll speed may be about 2 ppf.

In FIGS. 1 and 2, The 3D display 200 is held by a holder 210, wherein the holder 210 is installed inside a dark room (not shown) maintained at 1 Lux or less. In this case, the 3D display device 200 may be vertically disposed to have a certain height from a bottom of the darkroom or to rotate in a certain direction, by the stand 210. The 3D display 200 displays the right-eye moving picture pattern (R) and left-eye moving picture pattern (L) which are temporally divided based on the 3D pattern signal supplied from the pattern generator 100. For this end, the 3D display device 200 includes a 3D display panel (not shown) and a panel driver (not shown).

The 3D display panel displays a 3D picture corresponding to each of the right-eye moving picture pattern (R) and left-eye moving picture pattern (L), based on a shutter glass type.

A shutter glass type 3D display panel includes a plurality of unit pixels (not shown).

The unit pixels are respectively formed at a plurality of areas where a plurality of horizontal lines and vertical lines intersect perpendicularly. Each of the unit pixels includes a red sub-pixel, a green sub-pixel, and a blue sub-pixel that display a picture.

The panel driver displays the right-eye moving picture pattern (R) and left-eye moving picture pattern (L), inputted from the pattern generator 100, on the 3D display panel alternately per frame according to the driving type of the 3D display panel. For this end, the panel driver includes a picture conversion unit (not shown) and a shutter control signal generation unit (not shown).

Figure 4:
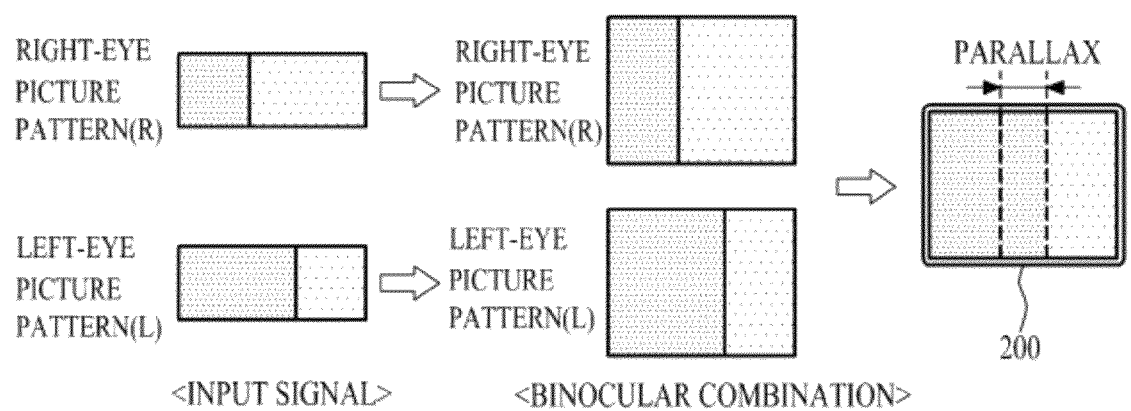
FIG. 4 is a diagram illustrating an operation where a right-eye moving picture pattern and left-eye moving picture pattern generated by the pattern generator of FIG. 2 are displayed on a 3D display device.

The picture conversion unit, as illustrated in FIG. 4, binocularly combines the right-eye moving picture pattern (R) and left-eye moving picture pattern (L) and displays the combined picture pattern on the 3D display panel. That is, the picture conversion unit maintains the horizontal resolutions HR of the right-eye moving picture pattern (R) and left-eye moving picture pattern (L) inputted from the pattern generator 100, as is. However, the picture conversion unit increases the vertical resolutions VR of the right-eye moving picture pattern (R) and left-eye moving picture pattern (L) by two times.

The shutter control signal generation unit generates a right-eye shutter control signal corresponding to the right-eye moving picture pattern (R) displayed on the 3D display panel and a left-eye shutter control signal corresponding to the left-eye moving picture pattern (L) displayed on the 3D display panel, and supplies the generated control signals to the polarization member 300. The 3D display device 200 includes a backlight unit (not shown) that irradiates light on the 3D display panel.

Figure 5:
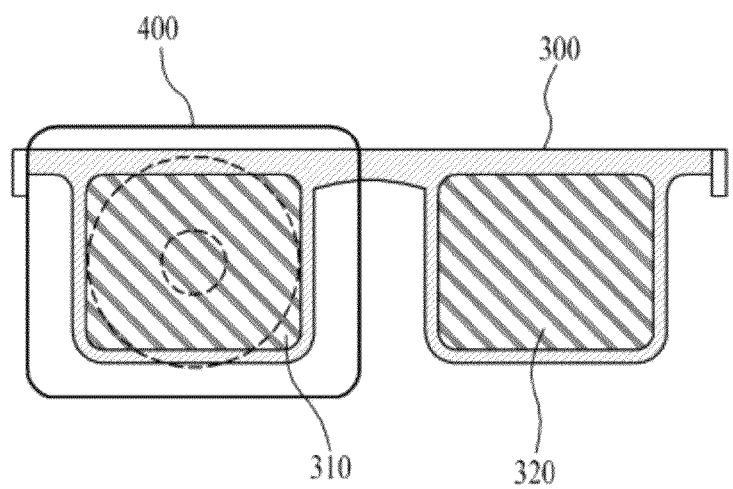
FIG. 5 is a diagram illustrating a polarization member which is mounted on a following camera of FIG. 1.

The polarization member 300 is disposed between the 3D display device 200 and the following camera 400, with a glasses stand (not shown). The polarization member 300 selectively passes the right-eye moving picture pattern (R) and left-eye moving picture pattern (L) displayed on the 3D display device 200 to be incident on the following camera 400, according to the shutter control signal outputted from the 3D display device 200. For this end, as illustrated in FIG. 5, the polarization member 300 includes a right-eye shutter 310 and a left-eye shutter 320.

The right-eye shutter 310 is disposed to face the following camera 400 when measuring the picture quality of the right-eye moving picture pattern (R) displayed on the 3D display device 200. In this case, the right-eye shutter 310 is mounted on a separate glasses stand (not shown) or the glasses stand (not shown) that is mounted on the following camera 400, adjacently to the following camera 400. However, the right-eye shutter 310 may be separated from the following camera 400 by at least 10 mm or more in order not to contact the following camera 400. When the 3D display device 200 displays the right-eye moving picture pattern (R) according to the shutter glass type, the right-eye shutter 310 includes a liquid crystal layer that is driven according to the right-eye shutter control signal outputted from the 3D display device 200 and passes only the right-eye moving picture pattern (R).

The left-eye shutter 320 is disposed to face the following camera 400 when measuring the picture quality of the left-eye moving picture pattern (L) displayed on the 3D display device 200. In this case, the left-eye shutter 320 is mounted on the separate glasses stand or the glasses stand that is mounted on the following camera 400, adjacently to the following camera 400. However, the left-eye shutter 320 may be separated from the following camera 400 by at least 10 mm or more in order not to contact the following camera 400. When the 3D display device 200 displays the left-eye moving picture pattern (L) according to the shutter glass type, the left-eye shutter 320 includes a liquid crystal layer that is driven according to the left-eye shutter control signal outputted from the 3D display device 200 and passes only the left-eye moving picture pattern (L).

The above-described glasses stand may have a slide structure in order for the right-eye shutter 310 and left-eye shutter 320 to move alternately.

Referring again to FIGS. 1 to 3B, the following camera 400 follows a right-eye boundary portion RBP between the first and second grayscale pattern areas GPA1 and GPA2 of the right-eye moving picture pattern (R) that passes though the right-eye shutter 310 of the polarization member 300 and is incident on the following camera 400, and measures a right-eye luminance value of the right-eye boundary portion RBP with time to supply the measured luminance value to the analyzer 600. Also, the following camera 400 follows a left-eye boundary portion LBP between the first and second grayscale pattern areas GPA1 and GPA2 of the left-eye moving picture pattern (L) that passes though the left-eye shutter 320 of the polarization member 300 and is incident on the following camera 400, and measures a left-eye luminance value of the left-eye boundary portion LBP with time to supply the measured luminance value to the analyzer 600.

The photo sensor 500 is disposed adjacently to the front of the 3D display device 200, and recognizes an input signal inputted from the pattern generator 100 to the 3D display device 200 to synchronize the 3D display device 200 and the following camera 400.

Figure 6:
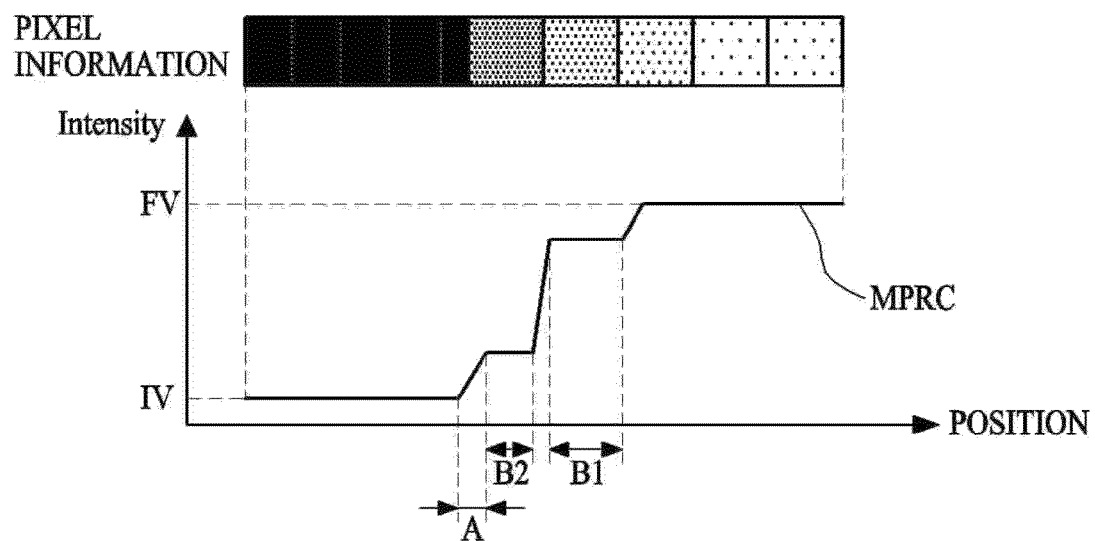
FIG. 6 is a diagram showing a moving picture response curve which is generated by an analyzer of FIG. 2.

The analyzer 600, as shown in FIG. 6, analyzes the time-based right-eye luminance value supplied from the following camera 400 to generate a right-eye moving picture response curve (MPRC) corresponding to the change of luminance that occurs with time (or for each pixel position) in the right-eye boundary portion RBP.

Moreover, the analyzer 600 analyzes the time-based left-eye luminance value supplied from the following camera 400 to generate a left-eye MPRC corresponding to the change of luminance that occurs with time in the left-eye boundary portion LBP.

Furthermore, the analyzer 600 provides the generated right-eye MPRC and left-eye MPRC to a user by displaying the right-eye MPRC and left-eye MPRC on a screen of the monitor 700.

The method of measuring picture quality of the stereoscopic display device by using the apparatus for measuring picture quality of the stereoscopic display device, according to an embodiment of the present invention, will be described below.

First, the right-eye shutter 310 of the polarization member 300 optimized for the 3D display device 200 is disposed at the front of the following camera 400.

Subsequently, the pattern generator 100 generates the right-eye moving picture pattern (R) and left-eye moving picture pattern (L) having a certain scroll speed.

The 3D display device 200 binocularly combines the right-eye moving picture pattern (R) and left-eye moving picture pattern (L) inputted from the pattern generator 100, displays the binocularly combined right-eye moving picture pattern (R) and left-eye moving picture pattern (L) on the 3D display panel alternately per frame, and moves the binocularly combined right-eye moving picture pattern (R) and left-eye moving picture pattern (L) at a predetermined scroll speed.

The following camera 400 follows the right-eye boundary portion RBP of the right-eye moving picture pattern (R) and simultaneously measures the luminance value of the right-eye moving picture pattern (R) that passes through the right-eye shutter 310 and is incident on the following camera 400.

The analyzer 600, as shown in FIG. 6, analyzes the right-eye luminance value of the right-eye moving picture pattern (R) measured by the following camera 400 to generate the right-eye MPRC. The analyzer 600 provides the generated right-eye MPRC to the user by displaying the right-eye MPRC on the screen of the monitor 700.

The following camera 400 follows the left-eye boundary portion LBP of the left-eye moving picture pattern (L) and simultaneously measures the luminance value of the left-eye moving picture pattern (L) that passes through the left-eye shutter 320 and is incident on the following camera 400.

The analyzer 600 analyzes the left-eye luminance value of the left-eye moving picture pattern (L) measured by the following camera 400 to generate the left-eye MPRC. The analyzer 600 provides the generated left-eye MPRC to the user by displaying the left-eye MPRC on the screen of the monitor 700.

According to the embodiments of the present invention, as described above, the polarization member 300 is disposed between the 3D display device 200 and following camera 400. The apparatus and method for measuring picture quality of the stereoscopic display device and the picture quality analyzing method using the same measure and analyze the luminance values of the respective pattern boundary portions RBP and LBP of the right-eye moving picture pattern (R) and left-eye moving picture pattern (L) that pass through the polarization member 300 and are incident on the following camera 400, with time, and thus can provide the MPRCs, that enable the quantification of a motion artifact and motion blur of a 3D moving picture in consideration of even an undesired moving picture artifact caused by a motion and gray-to-gray crosstalk, to the user.

A picture quality analyzing method using the apparatus and method for measuring picture quality of the stereoscopic display device, according to an embodiment of the present invention, will be described below in detail.

First, as shown in FIG. 6, the picture quality analyzing method calculates artifact widths by time unit, on the basis of the right-eye MPRC that has been generated by the above-described apparatus and method for measuring picture quality of the stereoscopic display device. That is, the picture quality analyzing method calculates an artifact width due to gray-to-gray crosstalk, between an initial luminance value IV and final luminance value FV of the right-eye MPRC for the right-eye boundary portion RBP. Herein, the artifact width is calculated by summing a width B1 of a first shadow area due to a depth from the screen of the 3D display device 200 to a stereoscopic phase discerned by a user and a width B2 of a second shadow area due to the shutter glass type (i.e., the display type of a moving picture pattern which is displayed on the screen of the 3D display device 200). In this case, the width B1 of the first shadow area may be calculated by counting the number of pixels included in the first shadow area, and the width B2 of the second shadow area may be calculated by counting the number of pixels included in the second shadow area. The number of pixels may be counted by a luminance analysis algorithm or a manufacturer.

As expressed in Equation (1) below, a 3D motion artifact width (MAW) of the right-eye moving picture pattern (R) is calculated by dividing an artifact width (AW) by a scroll speed (SS). Herein, a unit of the 3D motion artifact width is set as a pixel.

$$MAW = \frac{AW}{SS} \quad (1)$$

The calculated 3D motion artifact width (MAW) of the right-eye moving picture pattern (R) is stored.

In this way, a 3D motion artifact width (MAW) of the left-eye moving picture pattern (L) is calculated and stored.

Finally, the picture quality analyzing method provides the calculated 3D motion artifact width (MAW) of the right-eye moving picture pattern (R) and the calculated 3D motion artifact width (MAW) of the left-eye moving picture pattern (L) to the user by displaying the calculated 3D motion artifact widths (MAW) on the screen of the monitor 700. Furthermore, the picture quality analyzing method finally calculates the greater of the calculated 3D motion artifact widths (MAW) as the 3D motion artifact width MAW of the 3D display device 200, and provides the finally calculated 3D motion artifact width (MAW) to the user by displaying the finally calculated 3D motion artifact width (MAW) on the screen of the monitor 700.

As expressed in Equation (2) below, the picture quality analyzing method may further calculate a 3D motion artifact time (MAT) of the right-eye moving picture pattern (R) or left-eye moving picture pattern (L) by dividing an artifact width (AW) by the multiplication of a frame rate (FR) and scroll speed (SS).

$$MAT = \frac{AW}{FR \times SS} \quad (2)$$

In above equation (2), the frame rate (FR) indicates a time taken in driving one frame, and the scroll speed (SS) indicates a moving speed of a moving picture of a frame unit. For example, the frame rate (FR) may be 1/240, and the scroll speed (SS) may be 8/1000.

The picture quality analyzing method according to an embodiment of the present invention may further calculate a blurred edge width A (see FIG. 6) according to the initial luminance value of the MPRC for each of the boundary portions RBP and LBP and the number of pixels in a blurred area corresponding to the first shadow area B2 of the MPRC. Herein, the blurred edge width A is used to analyze motion blurring due to a Moving Picture Response Time (MPRT).

Figure 7:
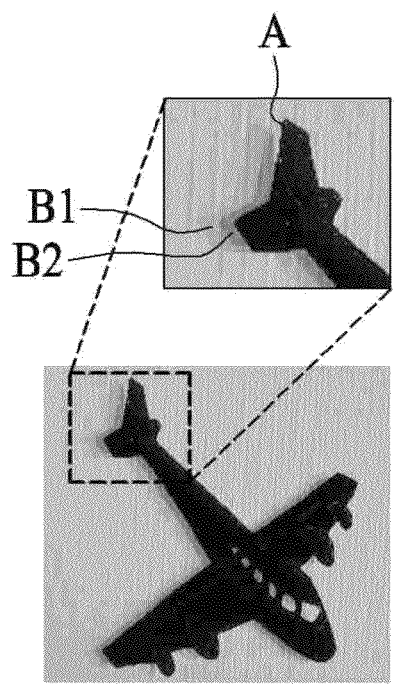
FIG. 7 is a diagram illustrating a moving picture which is used to simulate an apparatus and method for measuring picture quality of a stereoscopic display device, according to an embodiment of the present invention.
Figure 8:
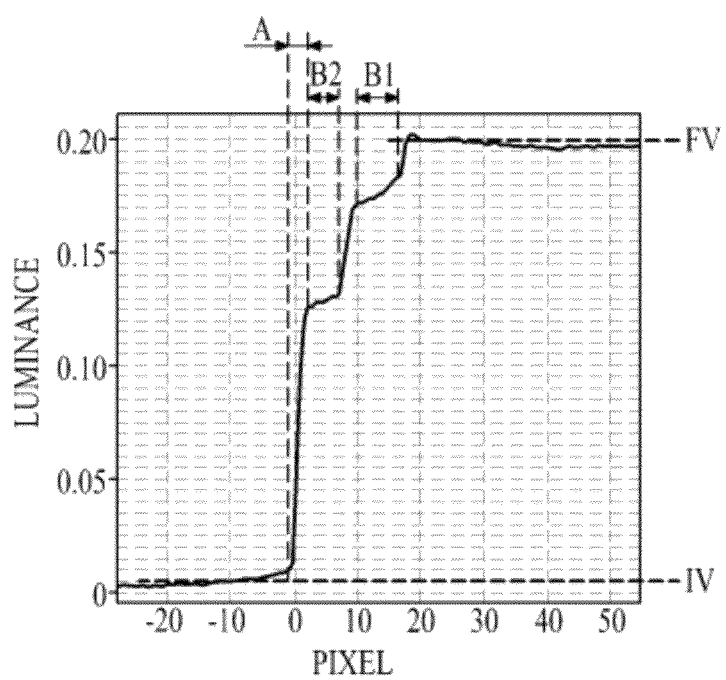
FIG. 8 is a diagram showing a moving picture response curve which has been measured by simulating the moving picture of FIG. 7.

Accordingly, the picture quality analyzing method measures picture quality of a 3D moving picture (see FIG. 7) which includes an airplane having a black grayscale on a background picture having a white grayscale, and then the measured picture quality is simulated. In FIG. 8 showing the simulated result, it can be seen that an undesired motion blur A and undesired moving picture artifacts B1 and B2 due to gray-to-gray crosstalk are more objectively measured and analyzed with an MPRC based on the change of luminance in a boundary portion between the background picture and airplane.

According to the embodiments of the present invention, as described above, the polarization member 300 is disposed between the 3D display device 200 and following camera 400. The apparatus and method for measuring picture quality of the stereoscopic display device and the picture quality analyzing method using the same measure and analyze the luminance values of the respective pattern boundary portions RBP and LBP of the right-eye moving picture pattern (R) and left-eye moving picture pattern (L) that pass through the polarization member 300 and are incident on the following camera 400, with time, and thus can quantify a motion artifact of a 3D moving picture in consideration of even the undesired moving picture artifacts B1 and B2 caused by a motion and gray-to-gray crosstalk, and moreover measure and analyze a motion blur.

In the above description, the present invention has been described as measuring the quality of a 3D picture based on the shutter glass type to generate an MPRC, but is not limited thereto. As another example, the present invention may measure the quality of a 3D picture based on a patterned retarder type to generate an MPRC. That is, an apparatus and method for measuring picture quality of a stereoscopic display device and a picture quality analyzing method using the same, according to another embodiment of the present invention, may measure the quality of a 3D picture based on the patterned retarder type to generate an MPRC, in the same scheme as one that is used in a 3D picture based on the shutter glass type, and analyze the quality of the 3D picture on the basis of the generated MPRC.

An apparatus for measuring picture quality of a stereoscopic display device, according to another embodiment of the present invention, will be described below in detail.

The pattern generator 100 generates a right-eye moving picture pattern (R) and a left-eye moving picture pattern (L) in the same scheme as one that is used in the shutter glass type.

The 3D display device 200 spatially divides the right-eye moving picture pattern (R) and the left-eye moving picture pattern (L) that are inputted from the pattern generator 100, and alternately displays the right-eye moving picture pattern (R) and the left-eye moving picture pattern (L) on one screen. For this end, the 3D display device 200 includes a 3D display panel (not shown) and a panel driver (not shown).

The 3D display panel includes a plurality of unit pixels (not shown), a plurality of left-eye retarder patterns, and a plurality of right-eye retarder patterns. When the 3D display panel is a liquid crystal display panel, the 3D display device 200 includes a backlight unit (not shown) that irradiates light on the 3D display panel.

The unit pixels are respectively formed at a plurality of areas where a plurality of horizontal lines and vertical lines intersect perpendicularly. Each of the unit pixels includes a red sub-pixel, a green sub-pixel, and a blue sub-pixel that display a picture. In this case, the horizontal lines are divided into a plurality of left-eye picture display lines and right-eye picture display lines, and the vertical lines are divided into a plurality of left-eye picture display lines and right-eye picture display lines. As an example, odd-numbered horizontal lines are set as left-eye picture display lines, and even-numbered horizontal lines are set as right-eye picture display lines. Odd-numbered vertical lines are set as left-eye picture display lines, and even-numbered vertical lines are set as right-eye picture display lines. On the contrary to this, setting may be made.

Each of the left-eye retarder patterns is formed in correspondence with a corresponding left-eye display line and polarizes a left-eye moving picture pattern (L) displayed on the corresponding left-eye display line. Each of the right-eye retarder patterns is formed in correspondence with a corresponding right-eye display line and polarizes a right-eye moving picture pattern (L) displayed on the corresponding right-eye display line. Such left-eye retarder pattern and right-eye retarder pattern have different light axes.

The panel driver displays a left-eye moving picture pattern (L) inputted from the pattern generator 100, on a corresponding left-eye picture display line and displays a right-eye moving picture pattern (R) inputted from the pattern generator 100, on a corresponding right-eye picture display line.

The polarization member 300 is disposed to face the 3D display device 200, and selectively passes a right-eye moving picture pattern (R) and left-eye moving picture pattern (L) displayed on the 3D display device 200 to be incident on a following camera 400. For this end, the polarization member 300 includes right-eye glasses (not shown) and left-eye glasses (not shown).

The right-eye glasses includes a left-eye polarization filter that passes only the right-eye moving picture pattern (R) displayed on the 3D display device 200.

The left-eye glasses includes a right-eye polarization filter that passes only the left-eye moving picture pattern (L) displayed on the 3D display device 200.

The left-eye polarization filter and right-eye polarization filter have different polarization axes optimized for the driving type of the 3D display device 200.

The following camera 400 follows a right-eye boundary portion RBP between first and second grayscale pattern areas GPA1 and GPA2 of a right-eye moving picture pattern (R) that passes though the right-eye glasses of the polarization member 300 to measure a right-eye luminance value of the right-eye boundary portion RBP with time, and supplies the measured right-eye luminance value to the analyzer 600.

Furthermore, the following camera 400 follows a left-eye boundary portion LBP between first and second grayscale pattern areas GPA1 and GPA2 of a left-eye moving picture pattern (L) that passes though the left-eye glasses of the polarization member 300 to measure a left-eye luminance value of the left-eye boundary portion LBP with time, and supplies the measured left-eye luminance value to the analyzer 600.

The analyzer 600 analyzes the time-based right-eye luminance value supplied from the following camera 400 to generate a right-eye MPRC corresponding to the change of luminance that occurs with time (or for each pixel position) in the right-eye boundary portion RBP.

Moreover, the analyzer 600 analyzes the time-based left-eye luminance value supplied from the following camera 400 to generate a left-eye moving MPRC corresponding to the change of luminance that occurs with time in the left-eye boundary portion LBP.

Furthermore, the analyzer 600 provides the generated right-eye MPRC and left-eye MPRC to a user by displaying the right-eye MPRC and left-eye MPRC on the screen of the monitor 700.

A method of measuring picture quality of the stereoscopic display device by using the apparatus for measuring picture quality of the stereoscopic display device, according to another embodiment of the present invention, will be described below.

First, the right-eye glasses of the polarization member 300 optimized for the 3D display device 200 is disposed at the front of the following camera 400.

The pattern generator 100 generates the right-eye moving picture pattern (R) and the left-eye moving picture pattern (L) having a certain scroll speed.

Subsequently, the 3D display device 200 binocularly combines the right-eye moving picture pattern (R) and left-eye moving picture pattern (L) inputted from the pattern generator 100, alternately displays the binocularly combined right-eye moving picture pattern (R) and left-eye moving picture pattern (L) on one screen of the 3D display panel, and moves the binocularly combined right-eye moving picture pattern (R) and left-eye moving picture pattern (L) at a predetermined scroll speed.

The following camera 400 follows the right-eye boundary portion RBP of the right-eye moving picture pattern (R) and simultaneously measures the luminance value of the right-eye moving picture pattern (R) that passes through the right-eye shutter 310 and is incident on the following camera 400.

The analyzer 60 analyzes the right-eye luminance value of the right-eye moving picture pattern (R) measured by the following camera 400 to generate a right-eye MPRC (not shown). The analyzer 600 provides the generated right-eye MPRC to the user by displaying the right-eye MPRC on the screen of the monitor 700. In this case, the right-eye MPRC may include a blurred area and shadow area between an initial luminance value and final luminance value of the right-eye boundary portion RBP. Herein, the blurred area of the right-eye MPRC is generated according to an MPRT based on the scroll speed of the right-eye moving picture pattern (R), and the shadow area is generated based on a depth from the screen of the 3D display device 200 to a stereoscopic phase discerned by the user.

The following camera 400 follows the left-eye boundary portion LBP of the left-eye moving picture pattern (L) and simultaneously measures the luminance value of the left-eye moving picture pattern (L) that passes through the left-eye glasses and is incident on the following camera 400.

The analyzer 60 analyzes the left-eye luminance value of the left-eye moving picture pattern (L) measured by the following camera 400 to generate a left-eye MPRC (not shown). The analyzer 600 provides the generated left-eye MPRC to the user by displaying the left-eye MPRC on the screen of the monitor 700. In this case, the left-eye MPRC may include a blurred area and shadow area between an initial luminance value and final luminance value of the left-eye boundary portion RBP. Herein, the blurred area of the left-eye MPRC is generated according to an MPRT based on the scroll speed of the left-eye moving picture pattern (L), and the shadow area is generated based on a depth from the screen of the 3D display device 200 to a stereoscopic phase discerned by the user.

The method of measuring picture quality of the stereoscopic display device by using the apparatus for measuring picture quality of the stereoscopic display device, according to another embodiment of the present invention, will be described below.

First, the picture quality analyzing method calculates artifact widths by time unit, on the basis of the right-eye MPRC that has been generated by the above-described apparatus and method for measuring picture quality of the stereoscopic display device. In this case, the width of the shadow area may be calculated by counting the number of pixels included in the shadow area, and the number of pixels may be counted by a luminance analysis algorithm or a manufacturer. For example, the artifact width may be calculated as the number of pixels included in the first shadow area B1 of FIG. 6.

Subsequently, as expressed in Equation (1), a 3D motion artifact width (MAW) of the right-eye moving picture pattern (R) is calculated by dividing an artifact width (AW) by a scroll speed (SS). Herein, a unit of the 3D motion artifact width is set as a pixel.

The calculated 3D motion artifact width (MAW) of the right-eye moving picture pattern (R) is stored.

In this way, a 3D motion artifact width (MAW) of the left-eye moving picture pattern (L) is calculated and stored.

Finally, the picture quality analyzing method provides the calculated 3D motion artifact width (MAW) of the right-eye moving picture pattern (R) and the calculated 3D motion artifact width (MAW) of the left-eye moving picture pattern (L) to the user by displaying the calculated 3D motion artifact widths (MAW) on the screen of the monitor 700. Furthermore, the picture quality analyzing method finally calculates the greater of the calculated 3D motion artifact widths (MAW) as the 3D motion artifact width MAW of the 3D display device 200, and provides the finally calculated 3D motion artifact width (MAW) to the user by displaying the finally calculated 3D motion artifact width (MAW) on the screen of the monitor 700.

The picture quality analyzing method according to another embodiment of the present invention, as expressed in Equation (2), may further calculate a 3D motion artifact time (MAT) of the right-eye moving picture pattern (R) or left-eye moving picture pattern (L) by dividing an artifact width (AW) by the multiplication of a frame rate (FR) and scroll speed (SS).

The picture quality analyzing method according to another embodiment of the present invention may further calculate and store a blurred edge width A (see FIG. 6) according to the number of pixels in a blurred area on an MPRC for each of the boundary portions RBP and LBP. Herein, the blurred edge width A is used to analyze motion blurring due to an MPRT.

According to the embodiments of the present invention, as described above, the polarization member 300 is disposed between the 3D display device 200 and following camera 400. The apparatus and method for measuring picture quality of the stereoscopic display device and the picture quality analyzing method using the same measure and analyze the luminance values of the respective pattern boundary portions RBP and LBP of the right-eye moving picture pattern (R) and left-eye moving picture pattern (L) that pass through the polarization member 300 and are incident on the following camera 400, with time, and thus can quantify a motion artifact of a 3D moving picture in consideration of even an undesired moving picture artifact caused by a motion and gray-to-gray crosstalk, and moreover measure and analyze a motion blur.

As a result, the apparatus and method for measuring picture quality of the stereoscopic display device and the picture quality analyzing method using the same measure the quality of a 3D picture based on the shutter glass type or patterned retarder type to generate an MPRC, and thus can quantify a motion artifact of a 3D moving picture in consideration of even an undesired moving picture artifact caused by a motion and gray-to-gray crosstalk, and moreover measure and analyze a motion blur more objectively.

According to the embodiments of the present invention, as described above, the polarization member is disposed between the 3D display device and following camera, and by measuring and analyzing analyze the luminance values of the respective pattern boundary portions of the right-eye moving picture pattern and left-eye moving picture pattern that pass through the polarization member and are incident on the following camera, with time, the present invention can quantify a motion artifact of a 3D moving picture in consideration of even an undesired moving picture artifact caused by a motion and gray-to-gray crosstalk, and moreover measure and analyze a motion blur.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for measuring picture quality of a stereoscopic display device comprising:
   a pattern generator generating a right-eye moving picture pattern and a left-eye moving picture pattern which move at a predetermined scroll speed;

a Three-Dimensional (3D) display device displaying the right-eye moving picture pattern and left-eye moving picture pattern inputted from the pattern generator, on a screen;

a polarization member selectively passing the right-eye moving picture pattern and left-eye moving picture pattern displayed on the 3D display device;

a following camera following respective boundary portions of the right-eye moving picture pattern and left-eye moving picture pattern, which pass through the polarization member and are incident on the following camera, to measure luminance; and an analyzer analyzing the luminance measured by the following camera to generate a Moving Picture Response Curve (MPRC), calculating an artifact width on the basis of the MPRC, and calculating a 3D motion artifact width by dividing the artifact width by the scroll speed, wherein each of the right-eye moving picture pattern and left-eye moving picture pattern comprises a first grayscale pattern area having a grayscale level within a range from a black grayscale level to a white grayscale level, and a second grayscale pattern area having the same grayscale level as the first grayscale pattern area, or a grayscale level different from the first grayscale pattern area; and wherein the following camera follows a boundary portion between the first and second grayscale pattern areas of each of the right-eye moving picture pattern and left-eye moving picture pattern to measure luminance.

2. The apparatus according to claim 1, wherein, the right-eye moving picture pattern and left-eye moving picture pattern have a negative parallax by which a 3D picture is shown to protrude from the screen of the 3D display device, or the right-eye moving picture pattern and left-eye moving picture pattern have a positive parallax by which the 3D picture is shown to dent from the screen of the 3D display device.

3. The apparatus according to claim 1, wherein, the analyzer analyzes a right-eye luminance value of the boundary portion of the right-eye moving picture pattern measured by the following camera to generate a right-eye MPRC, and the analyzer analyzes a left-eye luminance value of the boundary portion of the left-eye moving picture pattern measured by the following camera to generate a left-eye MPRC.

4. The apparatus according to claim 1, wherein the 3D display device binocularly combines the right-eye moving picture pattern and left-eye moving picture pattern, and displays the binocularly combined right-eye moving picture pattern and left-eye moving picture pattern alternately per frame, on the screen.

5. The apparatus according to claim 4, wherein the 3D display device generates and outputs a right-eye shutter control signal and a left-eye shutter control signal respectively corresponding to the right-eye moving picture pattern and left-eye moving picture pattern displayed on the screen, and wherein the polarization member comprises:

a right-eye shutter passing only the right-eye moving picture pattern according to the right-eye shutter control signal; and a left-eye shutter passing only the left-eye moving picture pattern according to the left-eye shutter control signal.

6. The apparatus according to claim 1, wherein the 3D display device binocularly combines the right-eye moving picture pattern and left-eye moving picture pattern, and displays the binocularly combined right-eye moving picture pattern and left-eye moving picture pattern alternately on one screen.

7. The apparatus according to claim 1, further comprising a photo sensor to synchronize driving of the 3D display device and driving of the following camera.

8. A method of measuring picture quality of a stereoscopic display device comprising:

generating a right-eye moving picture pattern and a left-eye moving picture pattern which move at a predetermined scroll speed;

displaying the right-eye moving picture pattern and left-eye moving picture pattern on a screen of a Three-Dimensional (3D) display device;

selectively passing, by a polarization member, the right-eye moving picture pattern and left-eye moving picture pattern displayed on the 3D display device;

following, by a following camera, respective boundary portions of the right-eye moving picture pattern and left-eye moving picture pattern, which pass through the polarization member, to measure luminance; and analyzing the luminance measured by the following camera to generate a Moving Picture Response Curve (MPRC), calculating an artifact width on the basis of the MPRC, and calculating a 3D motion artifact width by dividing the artifact width by the scroll speed, wherein each of the right-eye moving picture pattern and left-eye moving picture pattern comprises a first grayscale pattern area having a grayscale level within a range from a black grayscale level to a white grayscale level, and a second grayscale pattern area having the same grayscale level as the first grayscale pattern area, or a grayscale level different from the first grayscale pattern area; and wherein the following camera follows a boundary portion between the first and second grayscale pattern areas of each of the right-eye moving picture pattern and left-eye moving picture pattern to measure luminance.

9. The method according to claim 8, wherein, the right-eye moving picture pattern and left-eye moving picture pattern have a negative parallax by which a 3D picture is shown to protrude from the screen of the 3D display device, or the right-eye moving picture pattern and left-eye moving picture pattern have a positive parallax by which the 3D picture is shown to dent from the screen of the 3D display device.

10. The method according to claim 8, wherein the generating of a Moving Picture Response Curve (MPRC) comprises:

analyzing a right-eye luminance value of the boundary portion of the right-eye moving picture pattern measured by the following camera to generate a right-eye MPRC; and analyzing a left-eye luminance value of the boundary portion of the left-eye moving picture pattern measured by the following camera to generate a left-eye MPRC.

11. The method according to claim 8, wherein the displaying of the right-eye moving picture pattern and left-eye moving picture pattern comprises:

binocularly combining the right-eye moving picture pattern and left-eye moving picture pattern; and displaying the binocularly combined right-eye moving picture pattern and left-eye moving picture pattern alternately per frame, on the screen.

12. The method according to claim 11, wherein the displaying of the right-eye moving picture pattern and left-eye moving picture pattern comprises generating and outputting a right-eye shutter control signal and a left-eye shutter control signal respectively corresponding to the right-eye moving picture pattern and left-eye moving picture pattern displayed on the screen, and wherein the selectively passing of the right-eye moving picture pattern and left-eye moving picture pattern by the polarization member comprises passing only the right-eye moving picture pattern according to the right-eye shutter control signal, or passing only the left-eye moving picture pattern according to the left-eye shutter control signal.

13. The method according to claim 8, wherein the displaying of the right-eye moving picture pattern and left-eye moving picture pattern comprises:

binocularly combining the right-eye moving picture pattern and left-eye moving picture pattern; and displaying the binocularly combined right-eye moving picture pattern and left-eye moving picture pattern alternately on one screen, and wherein the selectively passing of the right-eye moving picture pattern and left-eye moving picture pattern by the polarization member comprises: passing only the right-eye moving picture pattern with a right-eye polarization filter, or passing only the left-eye moving picture pattern with a left-eye polarization filter.

14. The method according to claim 8, further comprising synchronizing, by a photo sensor, driving of the 3D display device and driving of the following camera.

15. A method of analyzing picture quality of a stereoscopic display device comprising:

generating a Moving Picture Response Curve (MPRC) of Three-Dimensional (3D) display device;

calculating an artifact width on the basis of the MPRC; and calculating a 3D motion artifact width by dividing the artifact width by the scroll speed, wherein the generating a Moving Picture Response Curve (MPRC) of Three-Dimensional (3D) display device comprises:

generating a right-eye moving picture pattern and a left-eye moving picture pattern which move at a predetermined scroll speed;

displaying the right-eye moving picture pattern and left-eye moving picture pattern on a screen of the 3D display device;

selectively passing, by a polarization member, the right-eye moving picture pattern and left-eye moving picture pattern displayed on the 3D display device;

following, by a following camera, respective boundary portions of the right-eye moving picture pattern and left-eye moving picture pattern, which pass through the polarization member, to measure luminance; and analyzing the luminance measured by the following camera to generate the MPRC, wherein each of the right-eye moving picture pattern and left-eye moving picture pattern comprises a first grayscale pattern area having a grayscale level within a range from a black grayscale level to a white grayscale level, and a second grayscale pattern area having the same grayscale level as the first grayscale pattern area, or a grayscale level different from the first grayscale pattern area; and wherein the following camera follows a boundary portion between the first and second grayscale pattern areas of each of the right-eye moving picture pattern and left-eye moving picture pattern to measure luminance.

16. The method according to claim 15, wherein the artifact width is a sum of the number of pixels in a first shadow area due to a depth from the screen of the 3D display device to a stereoscopic phase and the number of pixels in a second shadow area due to a display type of a moving picture pattern displayed on the screen of the 3D display device, between an initial luminance value and final luminance value of the MPRC for the boundary portion.

17. The method according to claim 16, further comprising calculating a blurred edge width according to the number of pixels in a blurred area corresponding to the initial luminance value and second shadow area.

18. The method according to claim 15, wherein the artifact width is the number of pixels in a shadow area due to a depth from the screen of the 3D display device to a stereoscopic phase, between an initial luminance value and final luminance value of the MPRC for the boundary portion.

19. The method according to claim 18, further comprising calculating a blurred edge width according to the number of pixels in a blurred area corresponding to the initial luminance value and shadow area.

20. The method according to claim 15, further comprising calculating a 3D motion artifact time by dividing the artifact width by a multiplication of the scroll speed and a frame rate.

* * * * *